April 16, 1968     A. B. HAWES     3,377,959
AERIAL CABLE ROUNDABOUT
Filed April 1, 1966     4 Sheets-Sheet 1
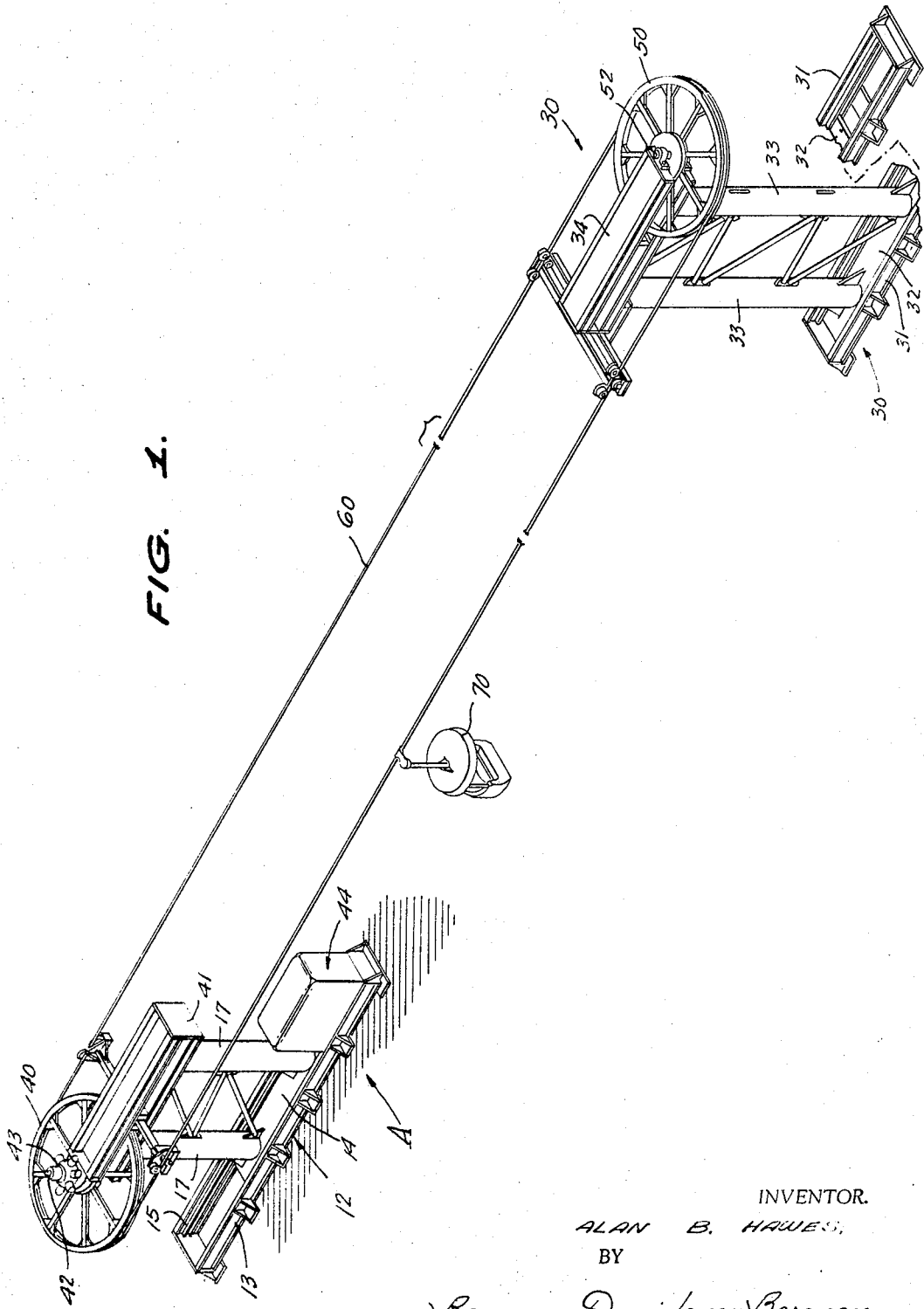
INVENTOR.
ALAN B. HAWES,
BY
Berman, Davidson & Berman
ATTORNEYS.

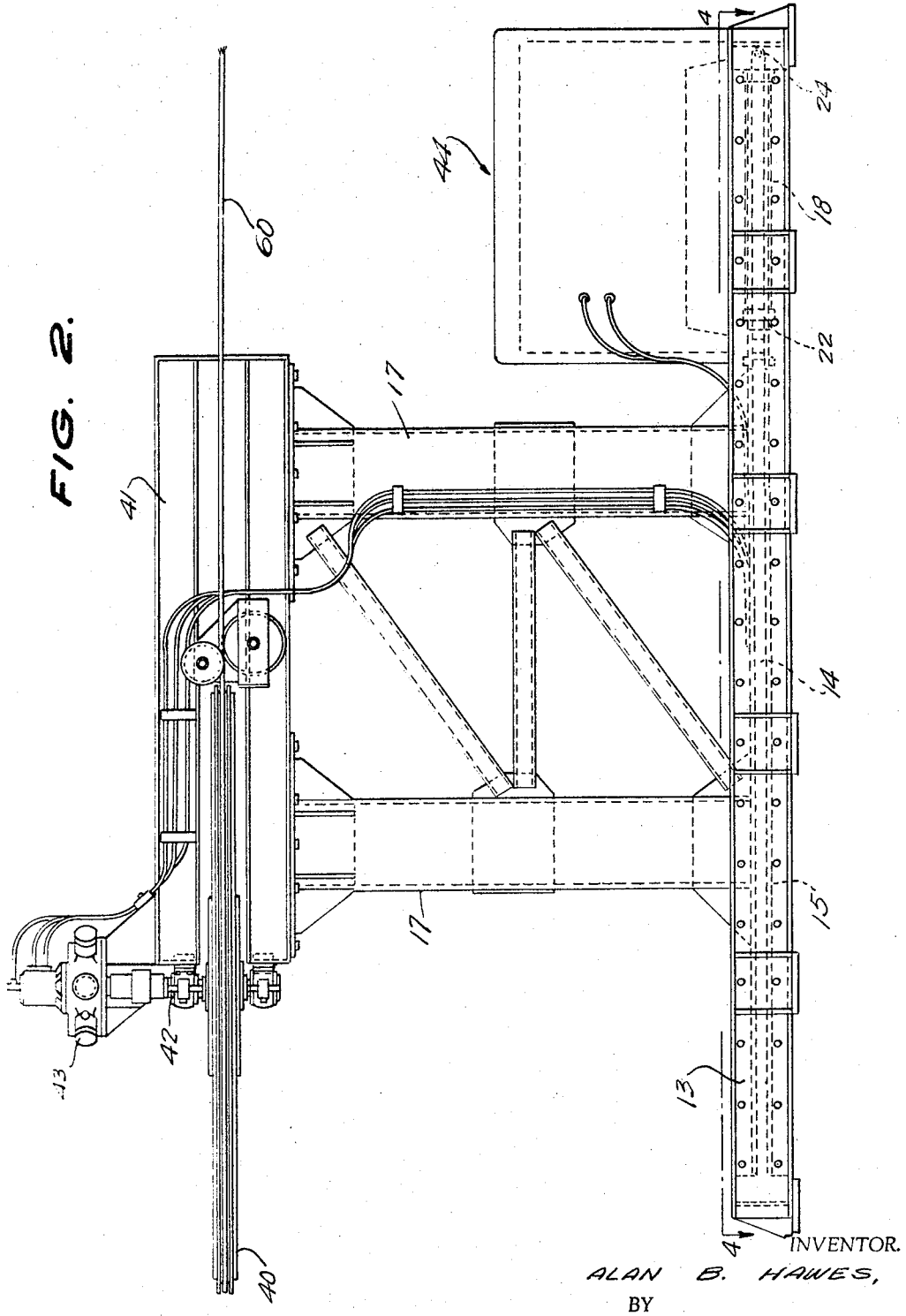

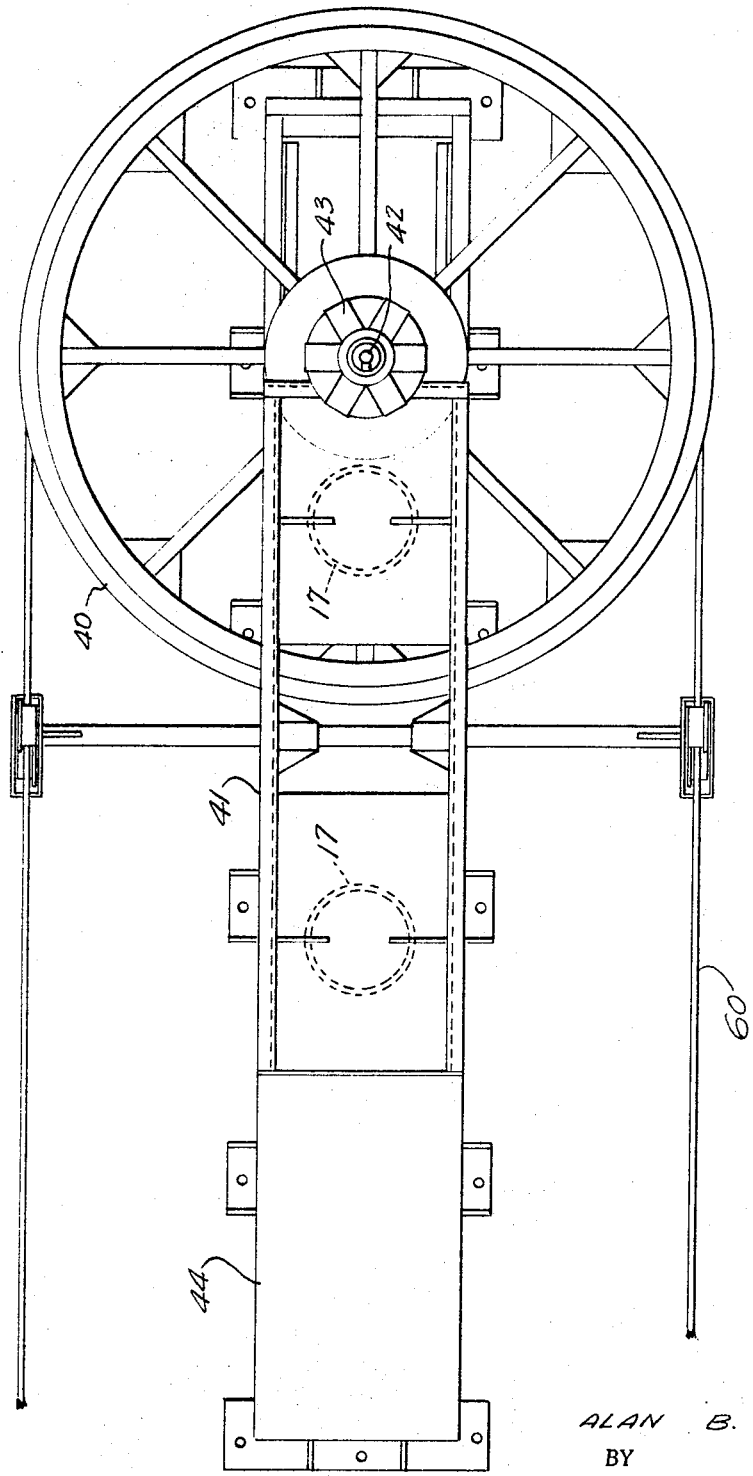

April 16, 1968  A. B. HAWES  3,377,959
AERIAL CABLE ROUNDABOUT
Filed April 1, 1966  4 Sheets-Sheet 4
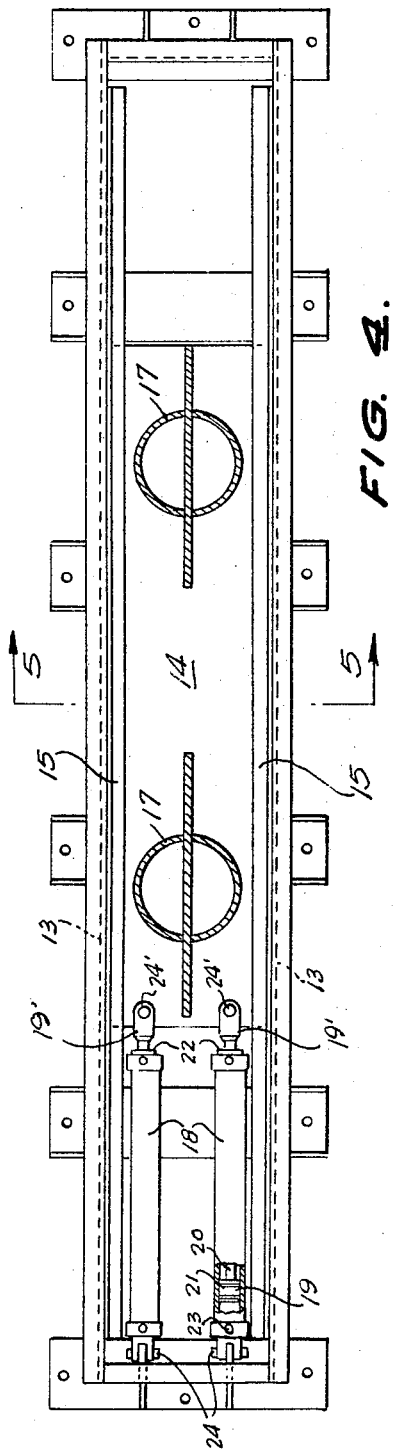
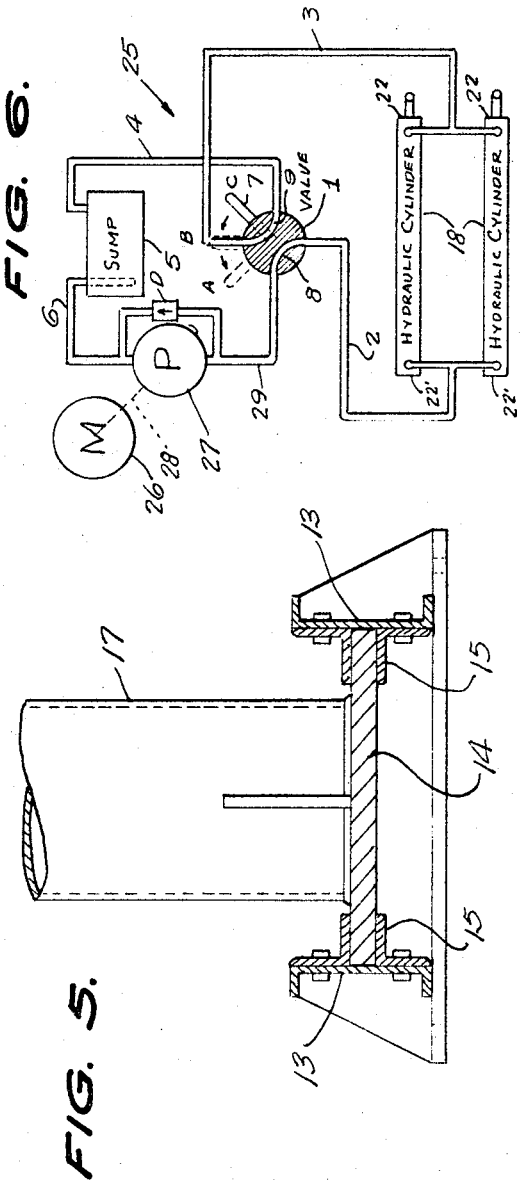
INVENTOR.
ALAN B. HAWES,
BY
Berman, Davidson-Berman
ATTORNEYS.

United States Patent Office
3,377,959
Patented Apr. 16, 1968

3,377,959
AERIAL CABLE ROUNDABOUT
Alan B. Hawes, 8504 Seaview Ave.,
Wildwood Crest, N.J. 08260
Filed Apr. 1, 1966, Ser. No. 539,537
5 Claims. (Cl. 104—117)

ABSTRACT OF THE DISCLOSURE

An aerial cable roundabout having first and second towers longitudinally spaced apart and mounting bull wheels at their tops for rotation about vertical axes, an endless cable trained about said wheels, a plurality of passenger-holding buggies suspended in spaced relation from said cable, a support mounting the base of said first tower for longitudinal movement and a double-acting, fluid pressure mechanism connecting the support to said first tower and selectively operable to move the first tower toward and away from the second tower and thereby loosen and tighten the tension of said cable.

---

This invention relates to an improvement in an aerial cable roundabout, the improvement being concerned with means for adjusting the tension of the driven cable.

An object of the improvement invention is to provide an aerial cable roundabout with means having no counterweight whereby tension of the driven cable may be tightened and loosened.

Another object of the improvement invention is to provide an aerial cable roundabout with hydraulic means whereby the tension of the driven cable may be tightened and loosened.

A further object of the improvement invention is to provide an aerial cable roundabout with hydraulic means whereby the tension of the driven cable may be adjusted, which means is simple in structure, positive in action, and commercially practical.

Other objects and advantages of the improvement invention will become apparent from the following description taken in conjunction with the accompanying drawings, in which:

FIGURE 1 is a perspective view, with parts broken away, of an aerial cable roundabout having the driven cable tension-adjusting means according to the present invention operatively-associated therewith.

FIGURE 2 is an enlarged side elevational view of the movable tower of the assembly of FIGURE 1.

FIGURE 3 is a top plan view of the assembly of FIGURE 2, but turned 180°.

FIGURE 4 is a top plan view taken on the line 4—4 of FIGURE 2.

FIGURE 5 is a fragmentary cross-sectional view taken on the line 5—5 of FIGURE 4.

FIGURE 6 is a graphic illustration of the hydraulically-operable mechanism for adjusting the tension of the driven cable of the aerial cable roundabout.

Referring to the drawings, the numeral 10 designates, generally, an aerial cable roundabout which, FIGURE 1, comprises a first tower 12 movably-supported upon a ground surface A, and a second tower 30 which is arranged in longitudinal spaced relation with respect to the first tower 12 and is fixedly-supported upon the ground surface A. A first bull wheel 40 is atop the first tower 12 and is connected to the first tower for rotary movement about a vertical axis or stub shaft 42, and a second bull wheel 50 is atop the second tower 30 and is connected to the second tower 30 for free rotary movement about another vertical axis or stub shaft 52, the wheels 40 and 50 being in longitudinal alignment. An endless cable 60 is trained about the first and second bull wheels 40 and 50 and drivingly-connects the bull wheels 40 and 50 together whereby the cable 60 drivingly-moves in a roundabout path. A plurality of passenger-holding buggies 70, only one being shown in FIGURE 1, are arranged in spaced relation thereabout the cable, and are suspendingly-supported from the cable 60.

The first tower 12 comprises an elongated trough-like base 13 in which is disposed a plank 14, the plank 14 extending for a portion of the length of the base and being connected to the base for limited sliding forward and backward movement. Specifically, the plank 14 is supported, FIGURE 5, in opposed slideways 15 for sliding forward and backward movement. Rising from the plank 14 is a column 17, the column being in the form of a pair of like columns 17 disposed in longitudinally-spaced relation and fixedly-attached to each other and to the plank 14. Fixedly-supported atop the spaced columns 17 is a beam member 41, and projecting vertically from one end of the member 41 is a vertical axis or stub shaft 42. The first bull wheel 40 is connected to the vertical axis or stub shaft 42 for rotary movement with said axis or shaft. This stub shaft 42 is driven by a hydraulic motor 43, FIGURE 2, the motor 43 being driven by means of a hydraulic system 44 operatively-connected by a plurality of flexible conduits 45 connecting the system 44 to the motor 43.

The second tower 30 includes an elongated trough-like base 31 in which is disposed a plank 32, the plank 32 extending for a portion of the length of the base 32 and being fixedly-secured to the base. Rising from the plank 32 is a column 33, the column being in the form of a pair of like columns 33 disposed in longitudinally-spaced relation and fixedly-attached to each other and to the plank 32. Fixedly-supported atop the spaced columns 33 is a beam member 34, and projecting vertically from one end of the member 34 is the other vertical axis or stub shaft 52. The second bull wheel 50 is connected to the other vertical axis or stub shaft 52 for free rotary movement about said axis or shaft 52.

The above-described aerial cable roundabout 10 is a conventional type of such roundabout, and because it is not a part of the improvement invention a more detailed description of its specific construction is deemed unnecessary.

As above-stated, this invention is concerned with an improvement in an aerial cable roundabout having the above-described construction, the improvement consisting of hydraulic, or other fluid pressure, means for mounting the first tower 12 for movement relative to the second tower 30 to thereby tighten and loosen the tension of the driven cable 60. Such means comprises the plank 14 carrying the longitudinally-spaced columns 17 which are mounted in the base 13 for limited forward and backward movement above-described in connection with the construction of the first tower 12, and a hydraulically-operable mechanism 25 which is operatively-connected to the plank 14. The aforesaid mechanism 25 is connected to the hydraulic system 44, not shown, and comprises, FIGURES 4 and 6, a pair of laterally-spaced horizontally-disposed closed-ended cylinders 18 which are positioned in a longitudinal direction in the space in the base 13 to one side of the plank 14, as clearly shown in FIGURE 4. Each cylinder 18 has a reciprocable piston 19 working therein with a piston rod 20 having one end attached to the piston, as at 21, and having the portion adjacent the other end extending slidably through one of the ends or end 22 of the cylinder 18. The cylinders 18 are arranged in the space in the base 13 to one side of the plank 14 so that the ends 22 of the cylinders 18 are adjacent to and spaced from the plank 14 and the other ends 23 of the cylinders 18 are remote from the plank 14 and are affixed to the adjacent end of the base 13 as at 24. As shown in FIGURE 4, the projecting end portions 19' of the piston rods 19 are fixedly-attached to the plank 14, as at 24'.

The hydraulically-operable mechanism 25 also includes hydraulic fluid actuating means which comprises a motor 26 which is connected to a pump 27 by means of a line 28. A line 29 connects the output side of the pump 27 to a three-position valve 1. A line 2 connects the valve 1 to the complemental one ends 22' of the pair of cylinders 18, and a line 3 connects the other of the complemental ends 22 of the pair of cylinders 18 to the valve 1. A line 4 connects the valve 1 to a sump 5, and a line 6 connects the sump 5 to the input side of the pump 27. A pressure-responsive bypass indicated by the letter D, FIGURE 6, connects to the lines 29 and 6.

To cause the pistons 19 to effect their forward movement and consequent like forward movement of the plank 14 the valve 1 is shifted from the neutral position indicated by the letter B, FIGURE 6, to the position indicated by the letter C, by moving the handle 7 to the position indicated by the letter C. This results in the flow of hydraulic fluid from the pump 27 through line 29 into and through the arcuate passage 8, out of the arcuate passage 8 into and through the line 2, into the complemental one ends 22' of the cylinders 18 and thereby causing the pistons 19 to move toward the other complemental ends 22 of the cylinders 18 and consequent forward movement of the plank 14, the hydraulic fluid discharging from the valve 1 to the sump 5 through the lines 4 and 3. At the conclusion of the forward movement of the pistons 19 the pistons 19 are maintained in their shifted positions by moving the handle 7 to the neutral position indicated by the letter B, resulting in locking of the hydraulic fluid in the cylinders 18. To cause the pistons 19 to effect their backward movement and consequent like backward movement of the plank 14, the valve 1 is shifted or moved from the neutral position indicated by the letter B by moving the handle 7 to the position indicated by the letter A. This results in the flow of the hydraulic fluid from the pump 27 through the line 29 into and through the arcuate passage 9, out of the arcuate passage 9 into and through the line 3 into the complemental other ends 22 of the cylinders 18 and thereby causing the pistons 19 to move backward to the one complemental ends 22' of the cylinders 18 and consequent backward movement of the plank 14, the hydraulic fluid discharging from the complemental one ends 22 of the cylinders 18 into the line 2, and into and out of the arcuate passage 8 of the valve 1, into and out of line 4 to the sump 5. Of course, the handle 7 is then shifted to neutral position indicated by the letter B to lock the piston 19 in the shifted position.

Heretofore, the tension of the driven cable of the aerial cable roundabout has been effected by the use of conduits which are difficult to control, and hence, have proven unsatisfactory. By the present improvement the adjustment of the tension of the driven cable may be effected not only with precision, but also enables the said tension to be maintained.

What is claimed is:

1. An aerial cable roundabout comprising rigid first and second towers arranged in longitudinal spaced relation, first and second bull wheels mounted atop said first and second towers respectively for rotation about vertical axes, an endless cable trained about said first and second bull wheels and drivingly-connecting said bull wheels, a plurality of passenger-holding buggies suspendingly-supported in spaced relation from said cable, support means mounting the base of said first tower for longitudinal movement, and a double-acting fluid pressure mechanism connecting the support means to said first tower and selectively operable to move the first tower toward and away from the second tower and thereby loosen and tighten the tension of said cable.

2. The roundabout according to claim 1, wherein said support means comprises an elongated base adapted to be fixedly-supported in the ground surface, a plank extending only for a portion of the length of the base and slidably disposed in longitudinal guideways in said base, said first tower having a column rising from said plank, said fluid pressure mechanism being operatively-connected to said base and plank to effect forward and backward movement of said plank.

3. The roundabout according to claim 2, wherein said fluid pressure mechanism includes a horizontally-disposed closed-ended cylinder having a reciprocable piston working therein with the piston rod having one end attached to said piston and having the portion adjacent the other end extending slidably through one of the ends of said cylinder, the cylinder being arranged in a longitudinal direction and positioned in the space in said base to one side of said plank so that the end from which the other end portion of the piston rod extends adjacent to and spaced from the plank and affixed to said plank and the other end of the cylinder remote from the plank adjecent to and affixed to the complemental end of the base, and hydraulic fluid actuating means operatively-connected to said cylinder for effecting the reciprocation of said piston to thereby impart forward and backward movement to said plank and consequent tightening and loosening of the tension of said cable.

4. The roundabout according to claim 1, wherein said fluid pressure mechanism comprises a double-acting fluid cylinder connected to said support means, and a piston therein connected to said first tower, fluid circuit means connecting the opposite ends of said cylinder to a pump, and valve means for controlling the direction of flow of pressure fluid to said cylinder.

5. The roundabout according to claim 4, wherein said valve means includes means for obturating flow of pressure fluid to and from both ends of said cylinder so as to lock said piston and tower against movement.

References Cited

UNITED STATES PATENTS

| 1,281,323 | 10/1918 | Ferris et al. | 104—117 |
| 3,071,083 | 1/1963 | Hochmuth | 104—178 |

ARTHUR L. LA POINT, *Primary Examiner.*

D. F. WORTH, *Assistant Examiner.*